US012758944B2

(12) United States Patent
Kadoi et al.

(10) Patent No.: US 12,758,944 B2
(45) Date of Patent: Oct. 13, 2026

(54) POROUS PARTICLES, METHOD FOR PRODUCING SAME, AND FILLER FOR CHROMATOGRAPHY USING SAME

(71) Applicant: JNC CORPORATION, Tokyo (JP)

(72) Inventors: Kenji Kadoi, Kanagawa (JP); Eri Iwamoto, Kanagawa (JP); Tsuyoshi Nakama, Kanagawa (JP)

(73) Assignee: JNC CORPORATION, Tokyo (JP)

( * ) Notice: Subject to any disclaimer, the term of this patent is extended or adjusted under 35 U.S.C. 154(b) by 366 days.

(21) Appl. No.: 18/577,700

(22) PCT Filed: Apr. 15, 2022

(86) PCT No.: PCT/JP2022/017899
§ 371 (c)(1),
(2) Date: Jan. 9, 2024

(87) PCT Pub. No.: WO2023/032346
PCT Pub. Date: Mar. 9, 2023

(65) Prior Publication Data

US 2024/0316534 A1 Sep. 26, 2024

(30) Foreign Application Priority Data

Sep. 6, 2021 (JP) ................................ 2021-144471

(51) Int. Cl.
*B01J 20/285* (2006.01)
*B01D 15/26* (2006.01)
(Continued)

(52) U.S. Cl.
CPC .......... *B01J 20/285* (2013.01); *B01D 15/265* (2013.01); *B01J 20/28085* (2013.01); *C08B 3/06* (2013.01);
(Continued)

(58) Field of Classification Search
CPC .............. B01J 20/285; B01J 2220/4825; B01J 2220/50; B01J 20/267; B01J 20/28004;
(Continued)

(56) References Cited

U.S. PATENT DOCUMENTS 4,312,980 A 1/1982 Motozato et al.
4,946,953 A * 8/1990 Okuma ...................... C08J 3/16 536/61
(Continued)

FOREIGN PATENT DOCUMENTS

CN 101336133 A * 12/2008 ........... B01D 15/102
CN 105518059 A * 4/2016 ............... C08B 3/06
(Continued)

OTHER PUBLICATIONS

English Machine translation of JP_H05340936_A, Dec. 24, 1993. (Year: 1993).*
(Continued)

*Primary Examiner* — Joseph W Drodge
(74) *Attorney, Agent, or Firm* — JCIPRNET

(57) ABSTRACT

A porous particle has a controlled 3D network skeleton and communicating pores that include the voids of the skeleton and penetrate from the particle surface to the inside, a method produces the same, and a filler for chromatography uses the same. The porous particle mainly includes cellulose acetate or cellulose, is spherical, and has a 3D network skeleton and communicating pores that include the voids of the skeleton and penetrate from the particle surface to the inside. The retention time of dextran with a molecular weight of 2 million at a flow rate of 0.4 ml/min in a column with an inner diameter of 0.78 cm and a length of 30 cm filled with the porous particles is 20 minutes or more.

13 Claims, 8 Drawing Sheets

(51) Int. Cl.
*B01J 20/28* (2006.01)
*C08B 3/06* (2006.01)
*C08L 1/12* (2006.01)

(52) U.S. Cl.
CPC ......... *C08L 1/12* (2013.01); *B01J 2220/4825* (2013.01); *B01J 2220/50* (2013.01)

(58) Field of Classification Search
CPC ............ B01J 20/28011; B01J 20/28019; B01J 20/28057; B01J 20/28069; B01J 20/28083; B01J 20/28085; B01J 20/286; B01J 20/30; B01J 20/3028; B01J 20/3085; B01J 20/24; B01J 20/26; B01J 20/281; B01D 15/265; C08B 3/06; C08B 15/08; C08J 3/16; C08L 1/12; C08L 71/02; C08L 1/02
See application file for complete search history.

(56) References Cited

U.S. PATENT DOCUMENTS

| | | | | |
|---|---|---|---|---|
| 5,064,950 | A * | 11/1991 | Okuma | C08J 3/16 536/124 |
| 2011/0301330 | A1* | 12/2011 | Matsumoto | B01J 39/26 252/184 |
| 2014/0311984 | A1 | 10/2014 | Nakama et al. | |
| 2016/0200835 | A1 | 7/2016 | Kurabayashi et al. | |
| 2016/0244483 | A1 | 8/2016 | Okubo et al. | |
| 2017/0210871 | A1 | 7/2017 | Shibata et al. | |
| 2018/0223067 | A1 | 8/2018 | Ishizuka et al. | |
| 2019/0210003 | A1 | 7/2019 | Okaniwa et al. | |
| 2021/0032372 | A1 | 2/2021 | Iwasa et al. | |
| 2021/0032415 | A1 | 2/2021 | Yoshimura et al. | |

FOREIGN PATENT DOCUMENTS

| | | | | |
|---|---|---|---|---|
| EP | 0750007 | | 12/2000 | |
| JP | S5624429 | | 3/1981 | |
| JP | H_05340936 | A * | 12/1993 | G01N 30/48 |
| JP | 2011072883 | A * | 4/2011 | B01J 20/24 |
| JP | 2011220992 | A * | 11/2011 | B01J 20/267 |
| JP | 2014148456 | | 8/2014 | |
| JP | 2014224223 | | 12/2014 | |
| JP | 5716297 | B2 * | 5/2015 | B01J 20/28016 |
| JP | 2019048987 | | 3/2019 | |
| JP | 2020026511 | | 2/2020 | |
| JP | 2021021044 | | 2/2021 | |
| JP | 2021021045 | | 2/2021 | |
| WO | WO-9832790 | A1 * | 7/1998 | B01J 20/287 |
| WO | WO-0158561 | A1 * | 8/2001 | B01J 20/289 |
| WO | 2015029790 | | 3/2015 | |
| WO | 2016013568 | | 1/2016 | |
| WO | 2016063702 | | 4/2016 | |
| WO | WO-2016167268 | A1 * | 10/2016 | B01J 20/30 |
| WO | 2017026424 | | 2/2017 | |
| WO | WO-2018181738 | A1 * | 10/2018 | B01J 20/285 |
| WO | 2021111730 | | 6/2021 | |

OTHER PUBLICATIONS

Escapenet Machine translation, CN101336133A, Nov. 9, 2006. (Year: 2006).*
Escapenet Machine translation of JP2011072883A, Apr. 14, 2011. (Year: 2011).*
Escapenet Machine translation of JP2011220992A, Nov. 4, 2011. (Year: 2011).*
Escapenet Machine translation of JP5716297B2, May 13, 2015. (Year: 2015).*
Escapenet Machine translation of CN105518059A, Apr. 20, 2016. (Year: 2016).*
Machine English translation of WO-2016167268A1, Oct. 20, 2016. (Year: 2016).*
Machine English translation of WO-2018181738A1, Oct. 4, 2018. (Year: 2018).*
Peter Dephillips et al., "Pore size distributions of cation-exchange adsorbents determined by inverse size-exclusion chromatography", Journal of Chromatography A, Jun. 23, 2000, pp. 39-54, vol. 883.
"International Search Report (Form PCT/ISA/210) of PCT/JP2022/017899", mailed on Jun. 28, 2022, with English translation thereof, pp. 1-6.
"Search Report of Europe Counterpart Application", issued on May 20, 2025, p. 1-p. 16.

* cited by examiner

POROUS PARTICLES, METHOD FOR PRODUCING SAME, AND FILLER FOR CHROMATOGRAPHY USING SAME

CROSS-REFERENCE TO RELATED APPLICATION

This application is a 371 application of the International PCT application serial no. PCT/JP2022/017899, filed on Apr. 15, 2022, which claims the priority benefits of Japanese Patent Application no. 2021-144471, filed on Sep. 6, 2021. The entirety of each of the above-mentioned patent applications is hereby incorporated by reference herein and made a part of this specification.

TECHNICAL FIELD

This invention relates to a porous particle, a method for producing the same, and a filler for chromatography using the same.

DESCRIPTION OF RELATED ART

As a material for chromatography used for separating and purifying biopharmaceuticals, monolith, which is an integrally molded body having a 3D network skeleton and communicating pores including voids thereof, is attracting attention. It is known that use of a monolith enables separation and purification with higher throughput and higher processing speed than conventional chromatography (Patent Literature 1).

In recent years, particles made from monoliths and having communicating pores have been proposed. The advantage of forming particles is that they can be used in the same way as a filler of a conventional chromatography separation column for easy handling, and that they can be easily scaled up. In addition, particles with communicating pores can also use the voids in the communicating pores inside the particles as adsorption sites when separating and purifying biopolymers, etc., making the material possible for separation-purification in high throughput and high processing speed. Methods for producing particles with communicating pores include, for example, a method of pulverizing a monolith to form particles (Patent Literature 2), and a method of directly forming particles having communicating pores (Patent Literatures 3, 4 and 5).

PRIOR-ART LITERATURES

Patent Literatures

Patent Literature 1: International Publication No. WO 2016/063702

Patent Literature 2: Japanese Unexamined Patent Publication No. 2014-148456

Patent Literature 3: International Publication No. WO 2016/013568

Patent Literature 4: International Publication No. WO 2017/026424

Patent Literature 5: Japanese Unexamined Patent Publication No. 2020-026511

Patent Literature 6: International Publication No. WO 2015/029790

Non-Patent Literatures

Non-Patent Literature 1: P DePhillips, A M Lenhoff, *J Chromatogr A*. 2000, 883, 39

SUMMARY OF INVENTION

Problems to be Solved by Invention

In the method where a monolith is pulverized into particles, there is a problem that the particles obtained by pulverization have irregular shapes and hence cannot be uniformly packed into a separation column for chromatography so that expected performance is not achieved. In addition, in the method of directly forming spherical particles, forming communicating pores at particle surfaces is difficult so that the pores are blocked, and the diameter of the communicating pores in each particle is uneven, so there is a problem that controlling the diameter of the communicating pores is difficult.

Accordingly, an object of this invention is to provide a porous particle having a controlled 3D network skeleton and communicating pores that include the voids of the skeleton and penetrate from the particle surface to the inside, a method for producing the same, and a filler for chromatography using the same.

Solution to the Problems

In order to solve the aforementioned problems, the inventors have made intensive study, and discovered a porous particle having a controlled 3D network skeleton and communicating pores that include the voids of the skeleton and penetrate from the particle surface to the inside, a method for producing the same, and a filler for chromatography using the same. This invention was thus completed.

That is, this invention is as follows.

[1] is a porous particle mainly including cellulose acetate or cellulose, which is characterized in: being spherical, having a 3D network skeleton and communicating pores that include the voids of the skeleton and penetrate from the particle surface to the inside, and that the retention time of dextran with a molecular weight of 2 million at a flow rate of 0.4 ml/min in a column with an inner diameter of 0.78 cm and a length of 30 cm filled with a plurality of the porous particles is 20 minutes or more.

[2] is the porous particle of [1] which is characterized in that the retention time of silica nanoparticles with a particle size of 30 nm at a flow rate of 0.4 ml/min in a column with an inner diameter of 0.78 cm and a length of 30 cm filled with a plurality of the porous particles is 16 minutes or more.

[3] is the porous particle of [1] or [2] whose mode diameter is in the range of 1 to 1000 μm.

[4] is the porous particle of any one of [1] to [3] whose specific surface area measured with a BET multipoint method is in the range of 1 to 200 $m^2/g$.

[5] is a method for producing porous particles, which comprises:

(a) a step of preparing a cellulose acetate solution, comprising heating and dissolving cellulose acetate in a mixed solvent of a solvent in which cellulose acetate is soluble and a solvent in which cellulose acetate is insoluble;

(b) a step of dispersing the cellulose acetate solution in water containing an emulsion stabilizer to obtain a dispersion system; and (c) a step of cooling the dispersion to precipitate cellulose acetate particles, wherein the mixed solvent is an organic solvent that is immiscible with water.

[6] is the method of [5] in which in (a), the solvent in which cellulose acetate is soluble is benzyl alcohol, ethyl acetate, cyclohexanone, or isophorone.

[7] is the method of claim [5] or [6] in which in (a), the solvent in which cellulose acetate is insoluble is an alcohol, a glycol, an ether, or an ester.

[8] is the method of any one of [5] to [7] in which in (a), the volume ratio of the solvent in which cellulose acetate is soluble to the solvent in which cellulose acetate is insoluble in the mixed solvent ranges from 5:95 to 95:5.

[9] is the method of any one of [5] to [8] in which in (a), the content of cellulose acetate in the mixed solvent is 0.1 to 30 wt % based on the cellulose acetate solution.

[10] is the method of any one of [5] to [9] in which in (a), the mixed solvent contains a polymer as a third component, which is polyethylene glycol or polypropylene glycol.

[11] is the method of any one of [5] to [10] in which in (b), the emulsion stabilizer is sodium dodecylbenzenesulfonate, polyvinyl alcohol, carboxymethyl cellulose, hydroxyethyl cellulose, or a mixture thereof.

[12] is the method of any one of [5] to [11] in which in (c), the cooling rate of the dispersion system is 0.1° C./min to 10° C./min.

[13] is a filler for chromatography, which comprises the porous particle of any one of [1] to [4], or the porous particle which has been saponified, crosslinked or modified.

[14] is the filler for chromatography of [13], which is used for separating and purifying virus particles.

Effect of Invention

The porous particle according to this invention has a controlled 3D network skeleton and communicating pores that include the voids of the skeleton and penetrate from the particle surface to the inside. Thereby, when separating and purifying biopolymers, etc., the voids in the communicating pores inside the particles can also be used as adsorption sites, making the porous particles a useful material that can achieve high throughput and high processing speed.

DESCRIPTION OF THE EMBODIMENTS

Figure 1:
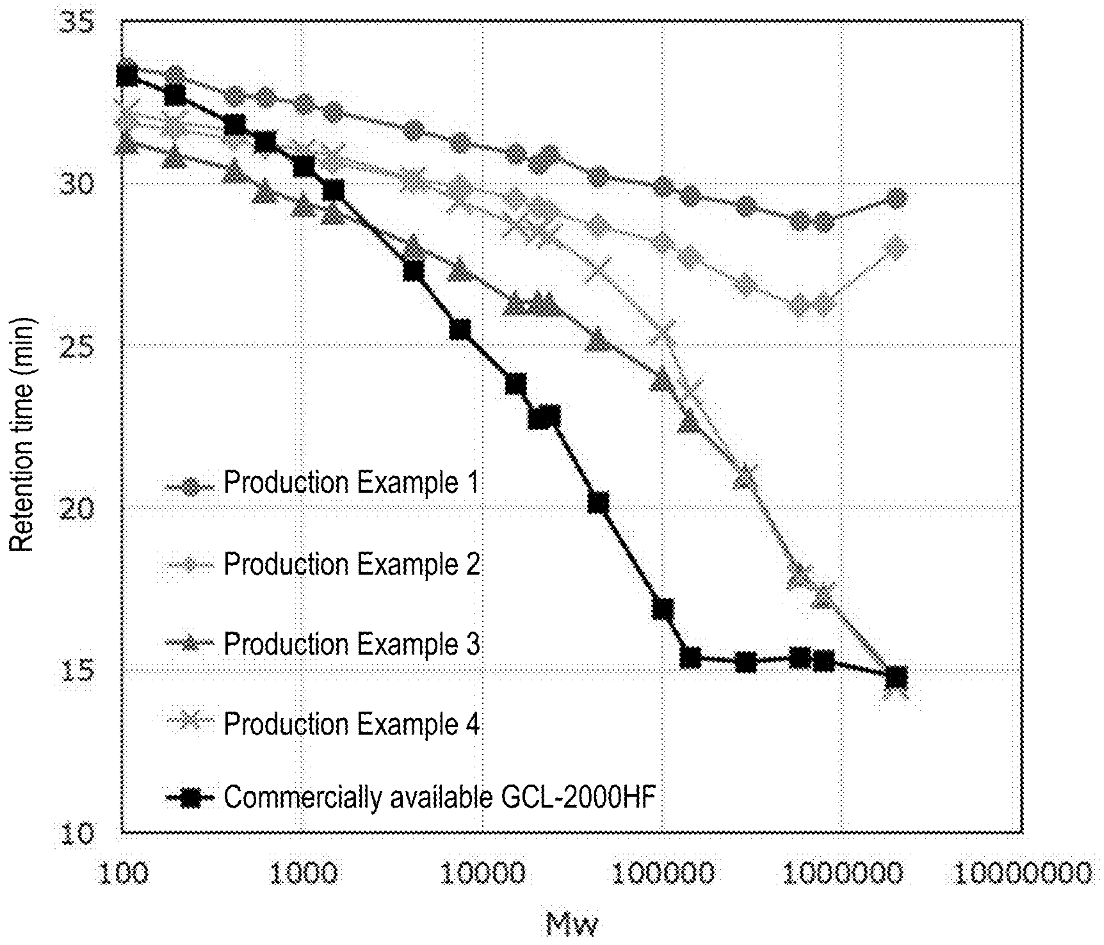
FIG. 1 shows the characteristics when the particles produced in Production Examples 1 to 4 were packed into a column, and is a graph showing the relationship between the molecular weight of the sample and the retention time.
Figure 2:
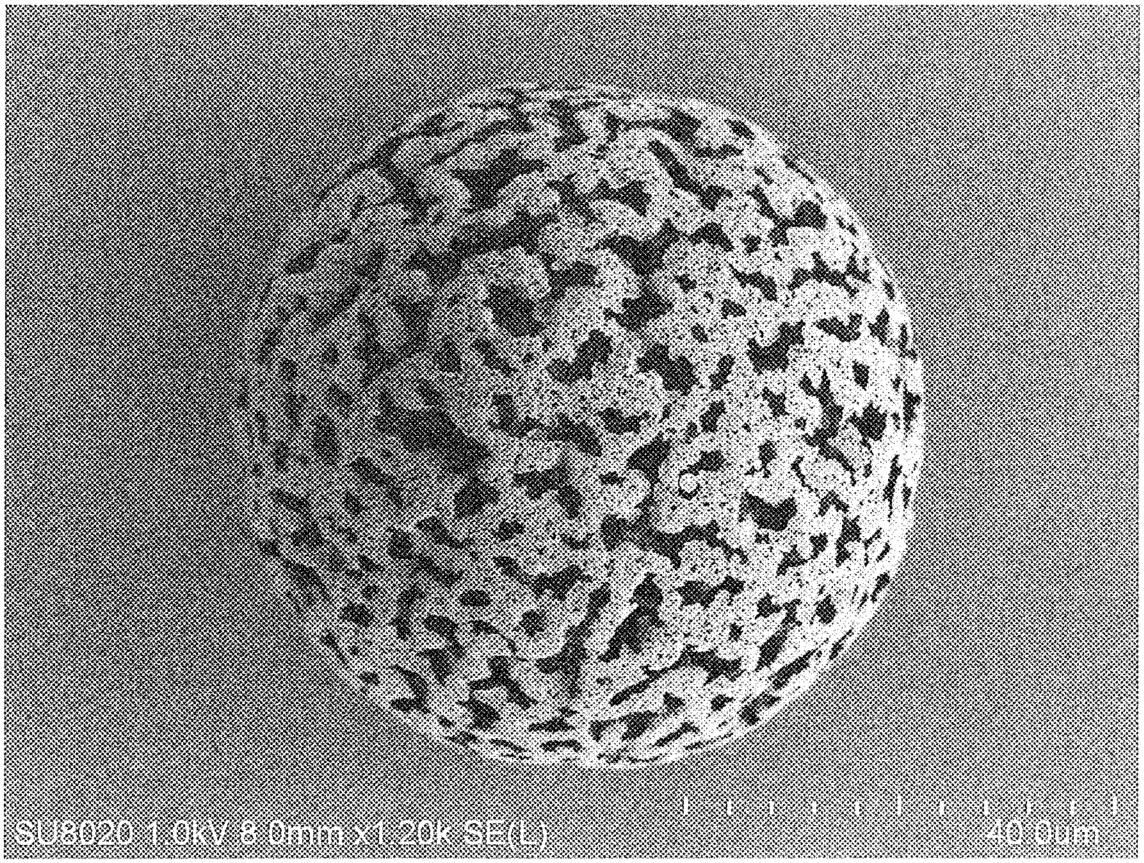
FIG. 2 is a photograph (1200× magnification) of the exterior of the particles produced in Production Example 1.
Figure 3:
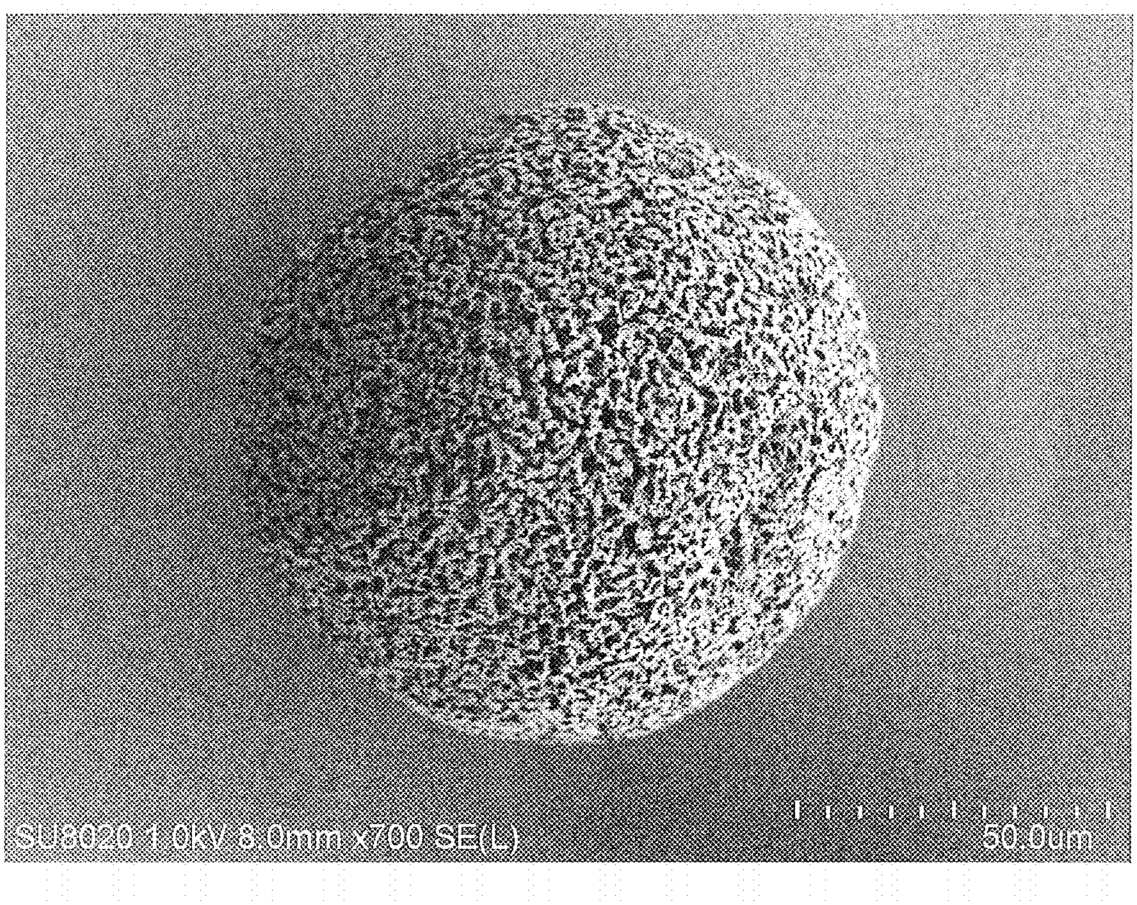
FIG. 3 is a photograph (700× magnification) of the exterior of the particles produced in Production Example 2.
Figure 4:
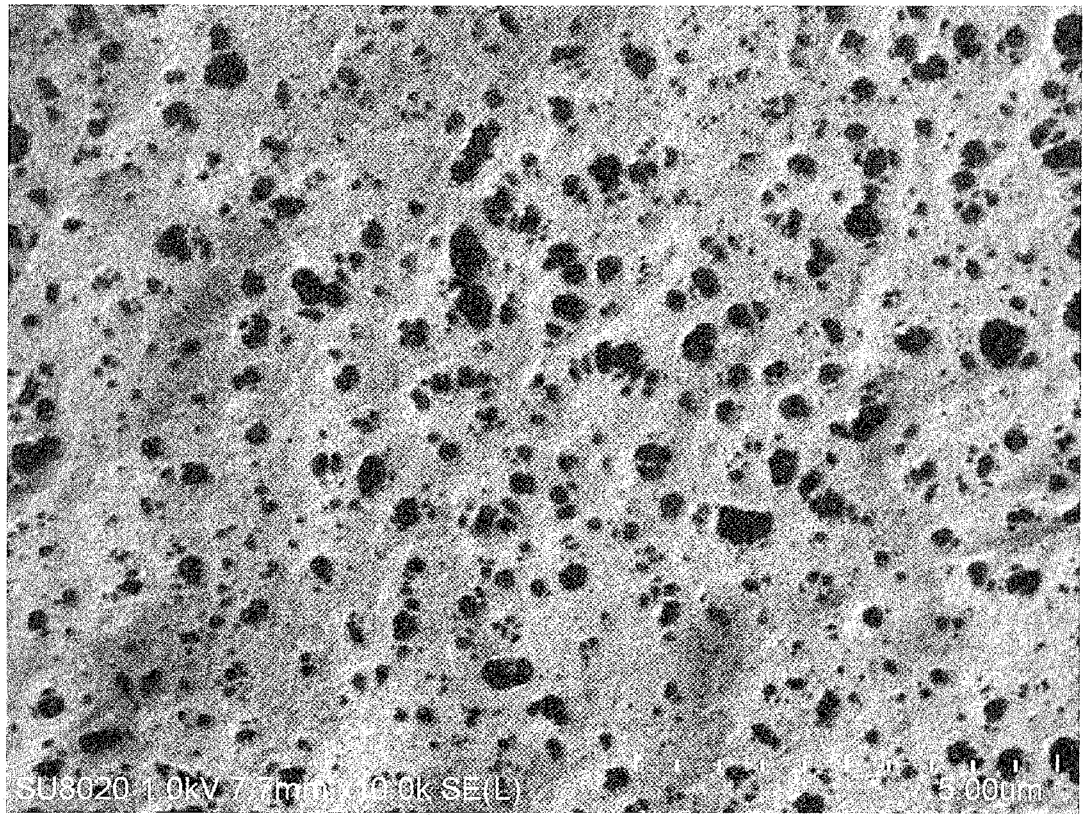
FIG. 4 is a photograph (10,000× magnification) of the exterior of the particles produced in Production Example 3.
Figure 5:
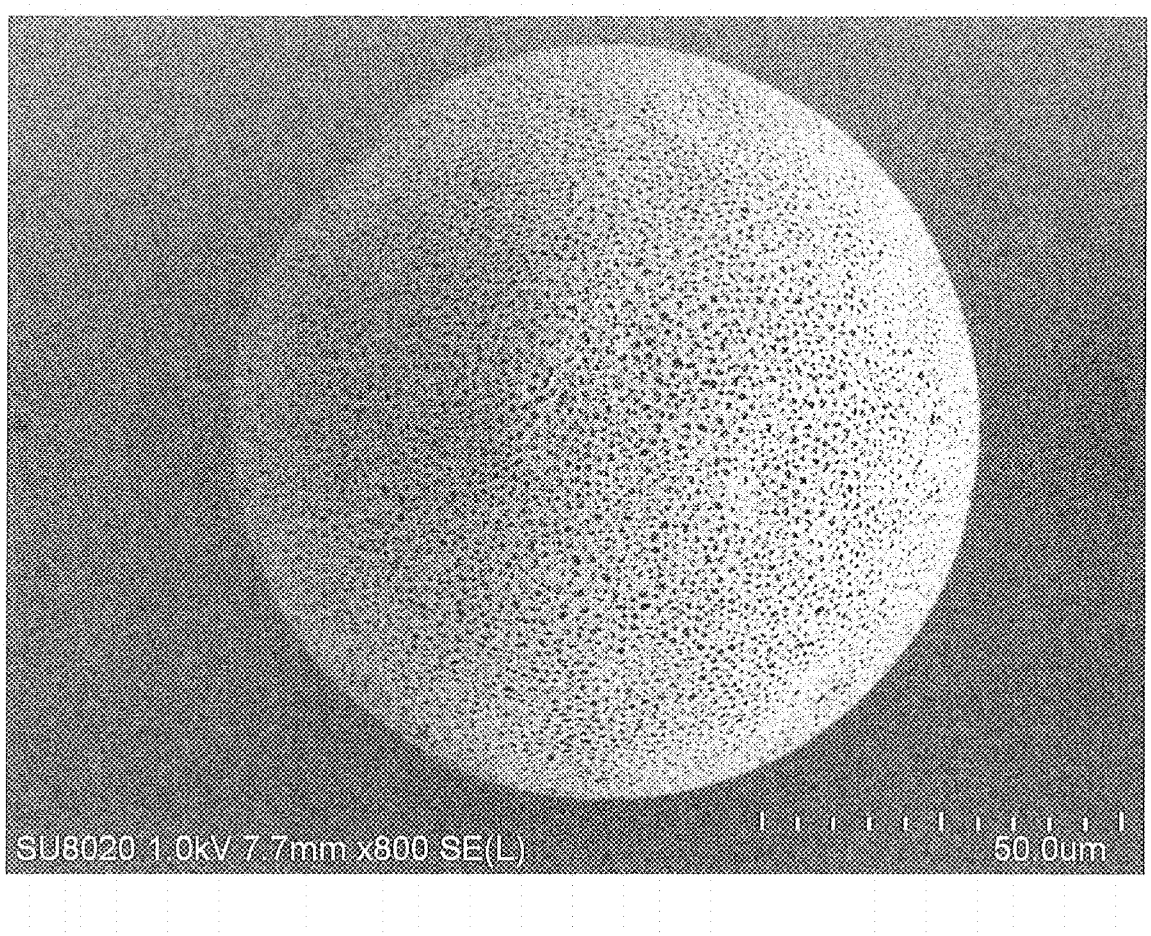
FIG. 5 is a photograph (800× magnification) of the exterior of the particles produced in Production Example 4.
Figure 6:
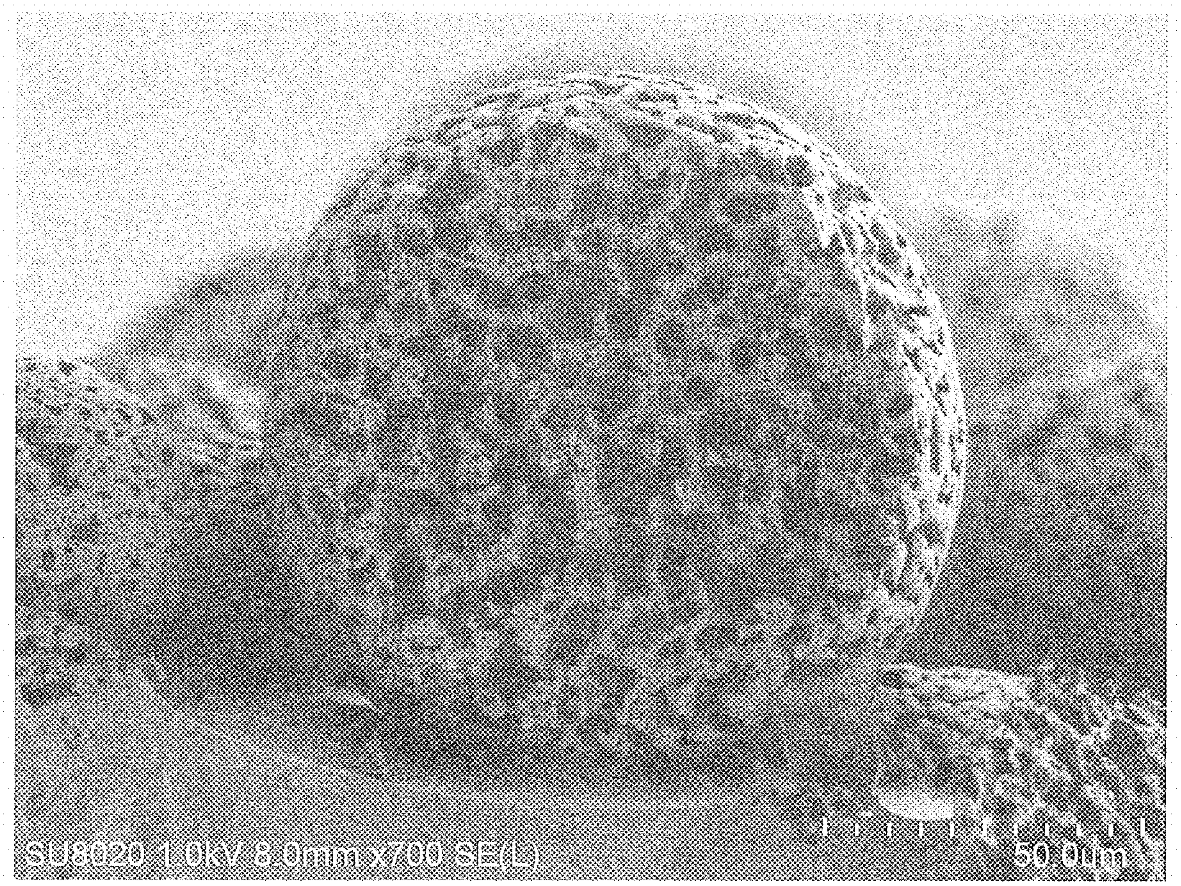
FIG. 6 is a photograph (700× magnification) of an internal cross section of a particle produced in Production Example 1.
Figure 7:
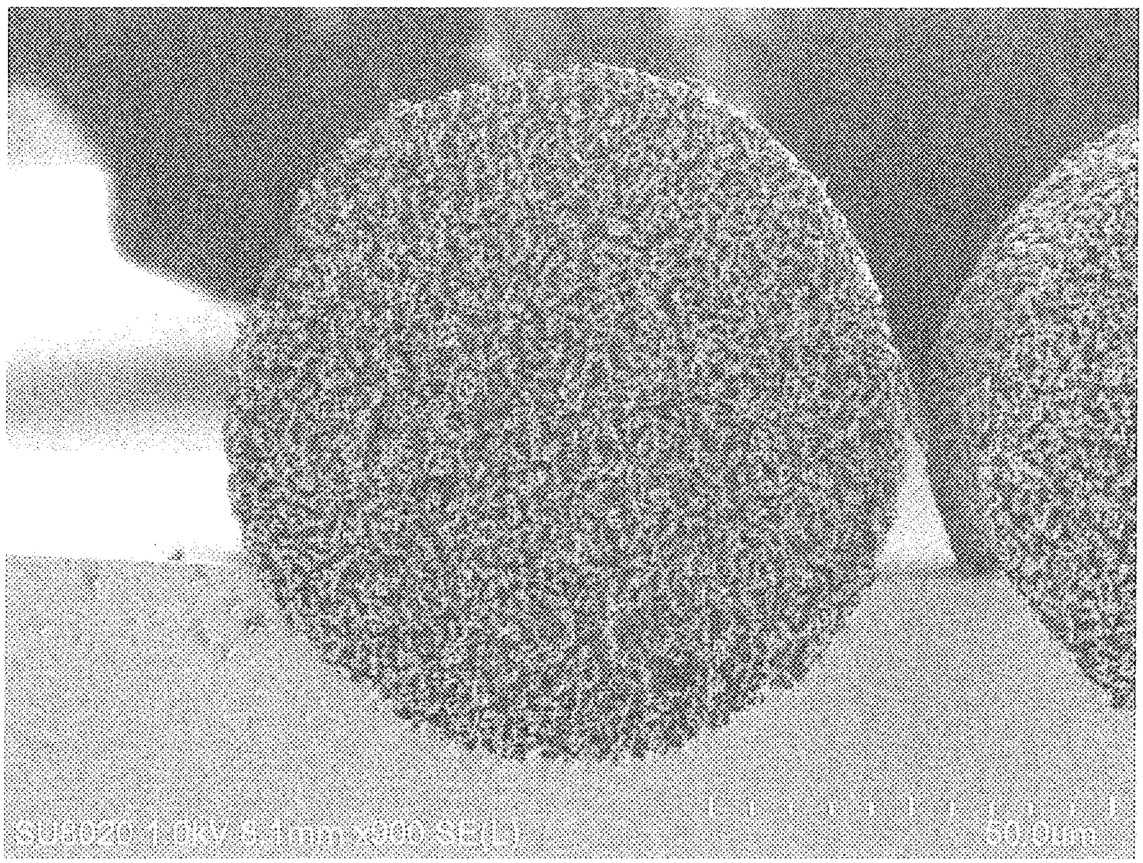
FIG. 7 is a photograph (900× magnification) of an internal cross section of a particle produced in Production Example 2.

The shape of the porous particle of this invention is spherical. The spherical shape here means, for example, that the major diameter (longest diameter) is twice or less the minor diameter (shortest diameter). It is preferred that the porous particle of this invention has a perfect spherical shape and the major diameter and the minor diameter are close to the same length.

The porous particles of this invention has a 3D network skeleton a communicating pore structure including the voids of the skeleton, wherein the communicating pores penetrate from the particle surface to the inside. Whether or not the particle has a 3D network skeleton and communicating pores can be determined, for example, from the result of observation of the cross section of the particle using a confocal laser microscope or SEM. In addition, the fact that the communicating pores penetrate from the particle surface to the inside can be confirmed from, for example, a photograph of the surface of the porous particle of this invention. In the porous particle of this invention, the communicating pores are not blocked at the particle surface and are open at the particle surface.

The porous particle of this invention satisfies the following characteristics. The retention time of dextran with a molecular weight of 2 million at a flow rate of 0.4 ml/min in a column with an inner diameter of 0.78 cm and a length of 30 cm filled with the porous particles is 20 minutes or more. From the viewpoint of utilizing the voids inside the porous particle as adsorption sites, the retention time of dextran with a molecular weight of 2 million is preferably 25 minutes or more, more preferably 27 minutes or more. The method for filling the column includes dispersing the particles in pure water to form a slurry, filling the column with the slurry and then flowing pure water at a flow rate of 0.4 ml/min for 1 hour or more to compact the particles. In addition, the retention time here is the time required from injecting the sample into the column to reaching an elution peak. The elution peak can be determined from the value at which the RI detection intensity is maximized by using, for example, an HPLC apparatus (1260 Infinity made by Agilent Technologies). In this invention, the retention time is measured using pure water as the mobile phase at a measurement temperature of 25° C.

In the field of chromatography, when measuring the pores of porous particles, it is common to use dextran with a molecular weight of 2 million as the exclusion limit molecular weight (Patent Literature 6). This is based on the premise that dextran with a molecular weight of 2 million cannot enter inside the porous particles. The porous particles of this invention retains dextran with a molecular weight of 2 million for a longer time than conventional particles. This shows that the porous particle of this invention has communicating pores through which dextran with a molecular weight of 2 million can enter inside the particle.

In general, it is known that when a column is filled with spherical porous particles, the porosity is 30% to 40% (Non-Patent Literature 1). The porosity here is the total volume of the gaps between the particles inside the column divided by the volume of the entire column. For example, assuming that the sample passes through only the gaps between the particles packed inside a column with an inner diameter of 0.78 cm and a length of 30 cm, the retention time at a flow rate of 0.4 ml/min is theoretically 10.7 to 14.3 minutes. That the retention time of dextran with a molecular weight of 2 million in the porous particles of this invention is 20 minutes or more indicates that the dextran with a molecular weight of 2 million enters not only the gaps between the particles but also inside the particles.

The porous particle of this invention more preferably satisfies the following characteristics. The retention time of silica nanoparticles with a particle size of 30 nm at a flow rate of 0.4 ml/min in a column with an inner diameter of 0.78 cm and a length of 30 cm filled with the porous particles is 16 minutes or more. From the viewpoint of utilizing the voids inside the particles as adsorption sites, the retention time of silica nanoparticles with a particle size of 30 nm is more preferably 18 minutes or more. The column filling method, the retention time and the measurement temperature are as described above. The particle of this invention has longer retention time for silica nanoparticles with a particle size of 30 nm than conventional particles. From this, the particle of this invention has communicating pores through which silica nanoparticles having a particle size of 30 nm can enter inside the particle.

The main component of the porous particle of this invention is cellulose acetate or cellulose. The main component here means a component whose content in the porous particle is 50% by mass or more. The cellulose acetate used in this invention is not particularly limited as long as it can be generally defined as cellulose acetate, but preferably has a degree of acetylation of 45 to 57%.

The porous particles of this invention have a mode diameter of 1 to 1000 μm. From the viewpoint of being useful as a filler for chromatography, the mode diameter of the porous particles is particularly preferably 35 μm to 200 μm. However, this invention is not limited to these. In addition, the mode diameter here is calculated by measuring the mode diameter using a particle size distribution measuring device: Laser Scattering Particle Size distribution Analyzer Partica LA-950, which was made by HORIBA.

The porous particle of this invention has a specific surface area of 1 to 200 $m^2/g$ as measured by the BET multipoint method. The specific surface area from the BET multipoint method can be measured by using, e.g., a high-speed specific surface area/pore distribution measuring device (BELSORP MAX II, made by MicrotracBEL). For example, the particles of the present invention can be lyophilized for one day and then pretreated by vacuum degassing at 100° C. for 2 hours before being measured. The specific surface area can be calculated from the adsorption isotherm (straight line) obtained by measuring the amount of nitrogen gas adsorbed on the solid surface at a measurement temperature of 77.3K and 3 or more points of relative pressures in the pressure range of 0.05 to 0.30.

Hereinafter, the method for producing porous particles of this invention is a method that includes: (a) a step of preparing a cellulose acetate solution, including heating and dissolving cellulose acetate in a mixed solvent of a solvent in which cellulose acetate is soluble and a solvent in which cellulose acetate is insoluble; (b) a step of dispersing the cellulose acetate solution in water containing an emulsion stabilizer to obtain a dispersion system; and (c) a step of cooling the dispersion to precipitate cellulose acetate particles, wherein the mixed solvent is an organic solvent that is immiscible with water.

With the production method of this invention, porous particles including cellulose as a main component and having 3D network skeleton and communicating pores that include the voids of the skeleton and penetrate from the surface of the particle to the inside can be well produced. In the production method of this invention, the particle size of the resulting porous particles and the pore size of the communicating pores can be easily controlled. For example, they can be controlled by the amount of the cellulose acetate raw material used, the kinds and the ratio of good and poor solvents used, the molecular weight and concentration of the polymer as the third component, the kind and the amount of the surfactant added, and the cooling rate, etc. The porous particles of this invention described above can be well produced by carrying out the aforementioned control in the production method of this invention.

Each of the above steps will be explained in order below.

[Step (a)]

In (a), cellulose acetate as a raw material is dissolved in a mixed solvent to prepare a cellulose acetate solution. Cellulose acetate is a semi-synthetic polymer obtained by acetic acid esterification of cellulose, which is a natural polymer. The cellulose acetate used in this invention is not particularly limited as long as it can be generally defined as cellulose acetate, but preferably has a degree of polymerization of 50 to 300 and a degree of acetylation of 45% to 57%. By using cellulose acetate with a degree of polymerization of 50 to 300 and a degree of acetylation of 45% to 57%, the cellulose acetate can be dissolved in more kinds of solvents.

In (a), the solvent in which the cellulose acetate is soluble, i.e., the good solvent, is not particularly limited as long as it can dissolve cellulose acetate, but an organic solvent with low solubility in water is preferred. The term “good solvent” as used herein refers to one in which the solute is dissolved in the solvent alone to obtain a clear solution containing no solid, and particularly refers to a solvent from which a solution of preferably 1 wt % or more can be obtained at a temperature below the boiling point of the solvent. One kind of solvent may be used alone, or two or more kinds of solvents may be used in combination. Specific examples include benzyl alcohol, ethyl acetate, cyclohexanone, isophorone, and mixtures thereof. Among these, benzyl alcohol is preferred in terms of creating communicating pores.

In (a), the solvent in which the cellulose acetate is insoluble, i.e., the poor solvent, can be exemplified as a lower alcohol, a glycol, an ether, an ester, and a mixture thereof. A poor solvent is a solvent having no or low solubility for a solute compared to a good solvent, specifically, a solvent that cannot dissolve the solute by itself at a temperature below the boiling point of the solvent to obtain a clear solution, and particularly, a solvent that cannot dissolve the solute in more than 1 wt % at a temperature below the boiling point of the solvent. Solvents with low solubility in water are preferred. In particular, lower alcohols are preferred, wherein 1-hexanol is more preferred in terms of forming communicating pores.

In (a), in the mixed solvent, the mixing ratio of the solvent in which cellulose acetate is soluble, namely the good solvent, and the solvent in which cellulose acetate is insoluble, namely the poor solvent, is preferably such that the good solvent is 5 to 95 v/v % and the poor solvent is 95 to 5 v/v %. The higher the proportion of the poor solvent contained in the mixed solvent, the larger the diameter of the communicating pores tends to be.

In (a), the proportion of cellulose acetate in the mixed solvent is preferably 0.1 to 30 wt %, more preferably 5 to 20 wt %. Within this range, a uniform solution can be obtained, and porous particles with clean communicating pores can be obtained easily. Also, when cooled, precipitation due to phase separation easily occurs, so the strength is sufficient, making it easier to maintain the particle shape. Furthermore, the lower the cellulose acetate concentration in the cellulose acetate solution, the smaller the particle size of the resulting porous particles tends to be and the larger the pore size of the communicating pores tends to be.

In (a), the mixed solvent is an organic solvent that is immiscible with water. If the mixed solvent were miscible with water, it would not be possible to obtain a dispersion system in step (b).

In (a), the mixed solvent may contain a polymer as a third component. As the polymer being the third component, polyethylene glycol or polypropylene glycol is preferred, and polypropylene glycol is more preferred.

In (a), when the third component is polypropylene glycol, its molecular weight is not particularly limited, but from the viewpoint of easy handling during the production process and the diameter of the communicating pores in the porous particles, an average molecular weight (Mw) of 100 to 3000 is preferred. Further, the higher the molecular weight of the polymer as the third component, the larger the diameter of the communicating pores tends to be.

In (a), the concentration of the third component in the mixed solvent is preferably 0.1 to 10 wt % from the viewpoint of the diameter of the communicating pores in the porous particles.

The higher the said value, the larger the diameter of the communicating pores tends to be.

In (a), the heating temperature in the heating-dissolution is preferably in the range of 50° C. to 130° C., for example. Preferably, cellulose acetate is dissolved in the mixed solvent in this temperature range. The time for this heating-dissolution is not particularly limited, and for example, the heating time can be 3 to 24 hours.

[Step (b)]

In (b), the cellulose acetate solution is dispersed in high-temperature water in which an emulsion stabilizer is dissolved. In this step, the volume ratio of the cellulose acetate solution to the high-temperature water is not particularly limited, as long as a dispersion system in which the cellulose acetate solution is a dispersed phase and the high-temperature water is a continuous phase can be obtained. From the viewpoint of obtaining a stable dispersion system, the volume ratio (dispersed phase/continuous phase) of the cellulose acetate solution and the high-temperature water is preferably 1.0 or less. Further, the temperature of the high-temperature water is preferably 50° C. to 100° C., more preferably 60° C. to 95° C.

In (b), regarding the dispersion method, any known method can be applied. Examples include a method using a mixer such as a stirrer, a method using a homogenizer, and a method using ultrasonic waves, etc. In addition, there is a method to obtain droplets by extruding the cellulose acetate solution through a thin nozzle using what is generally called a microreactor, and a method to extrude, from a porous membrane with a uniform pore size, the cellulose acetate solution or a mixture of the cellulose acetate solution, water and an emulsion stabilizer to shear the same. In this invention, the simplest method of dispersing using a stirrer was investigated.

In (b), the emulsion stabilizer is not particularly limited as long as it has the effect of increasing the stability of the dispersion system and preventing particle aggregation. Examples include: natural polymers, such as starch, pectin, alginic acid, alginate salts, and gelatin; processed natural polymers, such as methylcellulose, carboxymethylcellulose, and hydroxyethylcellulose; alcoholic OH-containing synthetic polymers, such as polyvinyl alcohol, and partially saponified products of polyvinyl acetate; $SO_3H$ group-containing polymers, such as sulfonated styrol; COOH group-containing polymers, such as acrylic esters; nitrogen-containing synthetic polymers, such as polyvinylpyrrolidone; inorganic powders, such as barium sulfate, talc, bentonite, and titanium oxide; anionic surfactants, such as sodium straight-alkyl-benzenesulfonate; cationic surfactants, such as alkyltrimethylammonium salts; amphoteric surfactants, such as alkyldimethylamine oxide; nonionic surfactants, such as fatty acid sorbitan esters; and mixtures thereof, etc. In particular, from the viewpoint of stabilizing the dispersion system, sodium dodecylbenzenesulfonate, polyvinyl alcohol, carboxymethyl cellulose, hydroxyethyl cellulose, or a mixture thereof is preferred.

The amount of the emulsion stabilizer used in (b) is preferably 0.01 wt % or more in the high-temperature water from the viewpoint of stabilizing the dispersion system. In this concentration range, when the amount of emulsion stabilizer added is increased, the particle size of the resulting porous particles tends to become smaller. On the contrary, when the amount of emulsion stabilizer added is small, the particle size of the resulting porous particles tends to become larger.

[Step (c)]

In (c), the dispersion system obtained in (b) as above is cooled. By the cooling, thermally induced phase separation occurs, and porous particles having communicating pores can be obtained.

In (c), the cooling rate of the dispersion system is preferably 0.1° C./min to 10° C./min. The lower the cooling rate in (c), the larger the diameter of the communicating pores tends to be. On the other hand, when the cooling rate is high, the diameter of the communicating pores tends to become small. When producing the porous particles of this invention described above, the cooling rate is preferably 0.1° C./min to 5° C./min, more preferably 0.1° C./min to 2° C./min.

In (c), the temperature at which the dispersion system is cooled is not particularly limited, as long as it is a temperature at which cellulose acetate particles precipitate. However, the cooling temperature is preferably 0° C. to 50° C. to completely precipitate the porous particles.

[Porous Particles, or Crosslinked or Modified Porous Particles]

According to an embodiment of this invention, a porous particle that can be produced by the above production method is provided. The porous particle can be used in the separation and the purification of various substances. Furthermore, the porous particle may be applied in the form of being saponified, crosslinked, or modified with a substituent.

By saponifying and crosslinking the porous particles, it is possible to impart mechanical strength and flow rate resistance that can withstand the use as a chromatography filler. The crosslinking treatment of porous particles can be performed referring to Japanese Unexamined Patent Publication No. 2009-242770, etc. By suitably designing/changing the experimental conditions, the target mechanical strength and flow velocity resistance can be imparted.

Further, by adding a ligand to at least a part of the reactive functional groups of the porous particles of this invention, an adsorbent capable of adsorbing various substances can be easily obtained. For example, the product can be used as a virus adsorbent for influenza virus, hepatitis virus, rabies virus, human papilloma virus, or adeno-associated virus, etc., an adsorbent for antibody drug purification, an exosome adsorbent, a nucleic acid adsorbent, or the like. Specifically, by saponifying and crosslinking the porous particles of this invention and then introducing a sulfated polysaccharide, it is possible to provide a chromatography filler suitable for separating or purifying virus particles. Regarding the introduction of the sulfated polysaccharide, it can be carried out with reference to Japanese Unexamined Patent Publication No. 2011-220992, etc.

Other ligands include, but are not limited to, ion exchange groups, such as 2-diethylaminoethyl (DEAE), carboxymethyl (CM), sulfone, and quaternary ammonium (Q); hydrophobic groups, such as phenyl and butyl; ligands having both an ion exchange group and a hydrophobic group to be used for the so-called mixed-mode separation; ligands for adsorbing proteins such as protein A and antibodies; and functional polymers, such as polycations such as polylysine, and polyanions such as heparin and polyglutamic acid; etc. These can be arbitrarily selected depending on the intended use of the particles, and their introduction can be carried out arbitrarily according to known methods.

The adsorption performance of the chromatography filler of this invention for influenza viruses can be evaluated, for example, by the method described in Japanese Unexamined Patent Publication No. 2011-220992. As the influenza virus used for evaluation, influenza viruses of type A or B, derived from embryonated chicken eggs, and derived from cultured cells such as MDCK cells can be used.

EXAMPLES

Hereinafter, this invention will be explained in more details with reference to Examples, but this invention is not limited to the aspects of these Examples.

Example 1

14 g of cellulose acetate (L-20, produced by Daicel) was added to a mixed solvent of 52.5 ml of benzyl alcohol, 47.5 ml of 1-hexanol, and 2 ml of polypropylene glycol (reagent of Wako Pure Chemicals, diol type, with an average molecular weight of 1,000) and stirred. Further, the cellulose acetate was dissolved by raising the temperature and stirring at 120° C. for 4 hours to obtain a transparent cellulose acetate solution. In addition, 60 mg of PVA (JP-18E, produced by JAPAN VAM & POVAL CO., LTD.) and 4.5 g of carboxymethylcellulose sodium (reagent of Wako Pure Chemicals) were added to 300 ml of pure water saturated with the mixed solvent, and the mixture was heated and stirred at 80° C. for 1 hour or more to dissolve the reagents and obtain a dispersion medium. Then, 100 g of the cellulose acetate solution was quickly poured into 300 ml of the dispersion medium, and the mixture was stirred at 80° C. and 250 rpm for 15 minutes to obtain a dispersion system. Subsequently, this dispersion system was left at room temperature of 20° C. and cooled to 40° C., wherein the cooling rate was 0.5° C./min on average. When the temperature reached 40° C., cellulose acetate particles precipitated so that spherical cellulose acetate particles were obtained. Thereafter, the obtained cellulose acetate particles were thoroughly washed with a large amount of water and then with methanol. After washing again with water, the obtained cellulose acetate spherical particles were passed through a sieve with an opening size of 250 μm and a sieve with an opening size of 45 μm to obtain porous particles with particle sizes of 45 to 250 μm.

Example 2

14 g of cellulose acetate (L-20, produced by Daicel) was added to a mixed solvent of 52.5 ml of benzyl alcohol, 47.5 ml of 1-hexanol, and 2 ml of polypropylene glycol (Reagent of Wako Pure Chemicals, triol type, with an average molecular weight of 700) and stirred. Further, the cellulose acetate was dissolved by raising the temperature and stirring at 120° C. for 4 hours to obtain a transparent solution. After that, particle formation, washing and sorting were carried out in the same manner as in Example 1 to obtain porous particles.

Example 3

16 g of cellulose acetate (L-20, produced by Daicel) was added to a mixed solvent of 55 ml of benzyl alcohol and 45 ml of 1-hexanol and stirred. Further, the cellulose acetate was dissolved by raising the temperature and stirring at 120° C. for 4 hours to obtain a transparent cellulose acetate solution. In addition, 6 g of hydroxyethyl cellulose (reagent of Wako Pure Chemicals) and 6 g of carboxymethyl cellulose sodium (reagent of Wako Pure Chemicals) were added to 600 ml of pure water saturated with the mixed solvent, and the mixture was heated and stirred at 80° C. for 1 hour or more to dissolve the reagents and obtain a dispersion medium. Then, 100 g of the cellulose acetate solution was quickly poured into 600 ml of the dispersion medium, and the mixture was stirred at 80° C. and 300 rpm for 15 minutes to obtain a dispersion system. Subsequently, this dispersion system was quenched by water bathing in water of 20° C. at a cooling rate of 4° C./min on average to obtain spherical particles. Thereafter, the particles were washed and sorted in the same manner as in Example 1 to obtain porous particles.

Example 4

16 g of cellulose acetate (L-20, produced by Daicel) was added to a mixed solvent of 55 ml of benzyl alcohol, 45 ml of 1-hexanol, and 1.5 ml of polypropylene glycol (reagent of Wako Pure Chemicals, triol type, with an average molecular weight of 1,500) and stirred. Thereafter, particle formation, washing and sorting were carried out in the same manner as in Example 3 to obtain porous particles.

Production Examples of producing crosslinked porous particles, which is one of the preferred usage forms of the porous particles of this invention, will be shown below.

Production Example 1

55 g of wet porous particles (water content: 6.31) obtained in Example 1 was added to a solution of 32 g of $Na_2SO_4$ in 124 g of pure water, and the mixture was stirred at a temperature of 40° C. for 30 minutes. Next, 2.93 mole equivalent of NaOH was added, and the mixture was stirred and reacted at 40° C. for 2 hours to saponify the porous particles. After the reaction, the temperature was raised to 50° C., and while stirring was continued, 0.9 g of 48% NaOH solution and 0.5 g of $NaBH_4$ were added, and the mixture was subjected to dissolution and reaction over 30 minutes. After the dissolution, 22 g of 48% NaOH solution and 30 g of epichlorohydrin were added in four equal portions every 60 minutes over approximately 3 hours. After the addition was completed, a reaction was carried out at a temperature of 50° C. for 16 hours. The temperature was cooled to below 40° C., and 5.8 g of acetic acid was added to neutralize. The reaction mixture was filtered to collect the gel, which was filtered and washed with pure water to obtain the target crosslinked porous particles.

Production Examples 2 to 4

The obtained particles of Examples 2 to 4 were subjected to a crosslinking step in the same manner as in Production Example 1 to obtain crosslinked porous particles of Production Examples 2 to 4.

[Evaluation of Particles]

Measurement of Retention Time

The particles obtained in Production Examples 1 to 4 above were packed into a stainless steel column (made by Tosoh) with an inner diameter of 0.78 cm and a length of 30 cm, and then the retention time of each sample was measured. As comparison of particle, commercially available GCL-2000HF (produced by JNC) was used. The packing method included dispersing the particles with pure water to form a slurry, filling the slurry in the column, and then flowing pure water at a flow rate of 0.4 ml/min for 1 hour or longer to compact the particles. The samples shown in Table 1 below were used. Pure water was used as the mobile phase during the measurement. The value at which the RI detection intensity was maximum was defined as the elution peak, and the corresponding time was defined as the retention time. The apparatus used for measurement is as follows.

Apparatus: 1260 Infinity HPLC apparatus (made by Agilent Technologies).

The above apparatus was used to measure the retention times. The results are shown in FIG. 1 and Table 2.

TABLE 1

| Sample | Molecular weight | Concentration (mg/ml) |
|---|---|---|
| Dextran T-2000 (produced by Pharmacia) | $2 \times 10^6$ | 5.0 |
| SE-150 (produced by Tosoh) | $7.86 \times 10^5$ | 5.0 |
| SE-70 (produced by Tosoh) | $5.8 \times 10^5$ | 5.0 |
| SE-30 (produced by Tosoh) | $2.9 \times 10^5$ | 5.0 |
| SE-15 (produced by Tosoh) | $1.43 \times 10^5$ | 5.0 |
| SE-8 (produced by Tosoh) | $1.01 \times 10^5$ | 5.0 |
| SE-5 (produced by Tosoh) | $4.42 \times 10^4$ | 5.0 |
| SE-2 (produced by Tosoh) | $2.36 \times 10^4$ | 5.0 |
| PEG21300 (produced by Agilent Technologies) | 20440 | 5.0 |
| PEG16100 (produced by Agilent Technologies) | 15260 | 5.0 |
| PEG7830 (produced by Agilent Technologies) | 7460 | 5.0 |
| PEG4040 (produced by Agilent Technologies) | 4110 | 5.0 |
| PEG1480 (produced by Agilent Technologies) | 1470 | 5.0 |
| PEG1010 (produced by Agilent Technologies) | 1020 | 5.0 |
| PEG610 (produced by Agilent Technologies) | 620 | 5.0 |
| PEG420 (produced by Agilent Technologies) | 420 | 5.0 |
| PEG194 (produced by Agilent Technologies) | 194 | 5.0 |
| PEG106 (produced by Agilent Technologies) | 106 | 5.0 |
| Silica nanoparticles of 30 nm (Sicaster, produced by Micromod) | — | 5.0 |

Each sample was used in an amount of 10 al for the measurement.

TABLE 2

| | Retention time of each sample (min) | |
|---|---|---|
| | Dextran T-2000 | Silica nanoparticles of 30 nm |
| Production Example 1 | 29.6 | 19.1 |
| Production Example 2 | 28.0 | 13.7 |
| Production Example 3 | 14.8 | 14.1 |
| Production Example 4 | 15.0 | 13.4 |
| GCL-2000HF (Commercial product) | 14.8 | 13.7 |

As a result of the measurement, the particles of Production Examples 1 and 2 caused dextran with a molecular weight of 2 million to have a retention time of 20 minutes or more. On the other hand, the particles of Production Examples 3 and 4 and GCL-2000HF made retention times less than 20 minutes, indicating that the pore diameter of the communicating pores was small (Table 2). Even when other polymer samples were used, the particles of Production Examples 1 and 2 made longer sample retention times than the particles of Production Examples 3 and 4 and GCL-2000HF (FIG. 1).

The retention time of the silica nanoparticles with a particle size of 30 nm in Production Example 1 was 16 minutes or more. On the other hand, the retention times of the same in Production Examples 2 to 4 and GCL-2000HF were less than 16 minutes (Table 2).

2. Measurement of Mode Diameter

For the particles obtained in Production Examples 1 to 4 above, particle size distributions were measured to determine the mode diameters. The apparatus used for the measurement was as follows.

Apparatus: Laser Scattering Particle Size distribution Analyzer Partica LA-960 (made by HORIBA).

The mode diameter was measured using the above device.

3. Measurement of BET Specific Surface Area

The particles obtained in Production Examples 1 to 4 above were measured for the BET specific surface area. The BET specific surface area was measured using a high-speed specific surface area/pore distribution measuring apparatus (BELSORP MAXII made by MicrotracBEL). The freeze-dried particles of Production Examples 1 to 4 were further degassed at 100° C. for 2 hours (vacuum degassing) for pretreatment and used as samples. It was determined from the adsorption isotherm (straight line) obtained by measuring the amount of nitrogen gas adsorbed on the solid surface at a measurement temperature of 77.3K and 5 or more points of relative pressures in the pressure range of 0.05 to 0.30. The evaluation results are shown in Table 3.

TABLE 3

| | Production Example 1 | Production Example 2 | Production Example 3 | Production Example 4 |
|---|---|---|---|---|
| Mode diameter (μm) | 84 | 83 | 95 | 84 |
| BET specific surface area ($m^2$/g) | 35 | 49 | 72 | 37 |

4. SEM Observation

SEM observation was performed using an ultra-high resolution field-emission scanning electron microscope “SU8020” made by Hitachi High Technologies. The particles of Production Examples 1 to 4, which had been freeze-dried as a pretreatment, were coated with Au for photographing. The electron micrographs showed that the obtained particles were almost perfectly spherical and had communicating pores at the surface and cross sections (FIGS. 2 to 7).

Production Examples regarding a filler for chromatography, which is one of the preferred forms of use of the porous particles of this invention, will be shown below.

[Use as Filler for Chromatography]

[Production Example 5] (Binding of Porous Particles and Sulfated Polysaccharide)

1) Epoxidation of Crosslinked Porous Particles 20 g of wet crosslinked porous particles (water content: 6.25) obtained in Production Example 1 was put into a reactor equipped with a stirrer, together with 24 ml of pure water. While the mixture was stirred well, the internal temperature was adjusted to 30° C., and 15.6 g of epichlorohydrin was added. After stirring for 15 minutes, 14.6 g of a 48% NaOH aqueous solution was added, and a reaction was conducted for 2 hr. After the reaction was completed, the reaction solution was filtered and thoroughly washed with water until the filtrate became neutral. Suction drying was performed for 30 minutes to obtain 20 g of epoxy activated wet gel. 1.0 g of the epoxy activated wet gel was shaken together with 3.0 ml of a 1.3 M sodium thiosulfate solution in a shaking machine set at 30° C. for 1 hour, and the amount of epoxy groups was determined by titration with 0.1 mol-L hydrochloric acid. The amount of epoxy groups was determined to be 230 μmol/g-dry.

2) Binding of Sulfated Polysaccharides 1.63 g of dextran sodium sulfate DS-500 (produced by Meito Sangyo Co., Ltd.) was put into a reactor equipped with a stirrer together with 18 ml of pure water, and the mixture was stirred until the dextran sodium sulfate was completely dissolved, and then 15 g of the epoxy activated wet gel produced in 1) (water content: 5.78; epoxy group amount: 230 μmol/g-dry) was added into the reactor. The internal temperature was adjusted to 30° C. while the mixture was well stirred, and after stirring for 15 minutes, 8.4 g of $Na_2SO_4$, 13.5 g of $Na_2HPO_4$, and 1.3 g of a 48% NaOH aqueous solution were added. The temperature was raised to 40° C., and a reaction was carried out for 6 hours. After the reaction was completed, a solution of 0.2 g of $NaBH_4$ dissolved in an aqueous solution prepared by adding 0.9 ml of a 48% NaOH aqueous solution to 9.7 ml of pure water was added, and the reaction was further continued for 16 hours. After the reaction, the reaction solution was filtered and thoroughly washed with water until the filtrate became neutral. Suction drying was performed for 30 minutes to obtain 15 g of wet dextran-sulfated porous particles.

Production Example 6

The crosslinked porous particles obtained in Production Example 4 were combined with the sulfated polysaccharide in the same manner as in Production Example 5 to obtain Production Example 6.

3) Virus Evaluation Test (1) Comparison of Commercially Available Cellufine Sulfate and the Filler for Chromatography of Production Example 5

The commercially available Cellufine Sulfate (produced by JNC) and the fillers for chromatography of Production Example 5 and Production Example 6 were used as fillers for chromatography. The commercially available Cellufine Sulfate used for comparison is a dense cellulose particle having sulfated polysaccharide as a ligand on the surface.

Each filler was dispersed in water and degassed while stirring under a reduced pressure. After the degassing, each filler for chromatography was filled in a ϕ5×30 mm column, the column was attached to AKTA avant (by Cytiva), and 0.01 M phosphate buffer with 0.12 M NaCl at pH=7.4 that was 10 times the column capacity or more was flowed to equilibrate. After that, 30 ml of a test virus solution of H1N1 strain (total HA value on use: 76800) having been filtered through a 0.45 μm membrane filter made of cellulose acetate (product name: GD/X syringe filter) was flowed through the column, and, from the start of the flowing, the effluent from the column was collected in 1.5 ml each time. After the flowing of the test virus solution was completed, flowing of 0.01 M phosphate buffer with 0.12 M NaCl at pH=7.4 was started, and the non-adsorbed fraction was washed away. After the washing for the non-adsorbed fraction was completed, flowing of 0.01 M phosphate buffer with 2 M NaCl at pH=7.4 was started, and the flowing was carried out until the virus adsorbed in the column was completely eluted. After the elution was completed, the HA titer was measured using 50 μL of the 1.5 ml fraction of the collected effluent. Further, the total liquid volume (μL) up to the fraction just before reaching 1/10 of the HA titer of the 50 μL test virus solution was determined. The 10% DBC in this measurement system was determined as follows.

10% DBC (HA titer/ml-gel)=(total liquid volume up to the fraction just before reaching 1/10 of the HA titer of the 50 μL test virus solution×1/50× HA titer of the 50 μL test virus solution)/column capacity (ml-gel)

(2) Measurement of Virus Activity HA Titer

Each well of a round-bottomed 96-well plate was added with 50 μL of physiological saline, and 50 μL of each of the evaluation samples (i.e., the elution fractions obtained above and, as a reference, the inactivated virus-containing solution) was added to the first vertical column of wells and well mixed. 50 μL of a 2-fold diluted resultant of this sample was added to the adjacent well and well mixed. The same operation was repeated to prepare 2- to 4096-fold diluted samples up to the $12^{th}$ well. 50 μL of a 0.5% chicken red blood cell suspension was added to each sample, mixed, and then left at room temperature for 1 hour. After 1 hour, the wells where blood cells did not aggregate and precipitate to the bottom were considered to have virus activity, and the dilution ratio up to one point before no activity was observed was defined as the HA titer per 50 μL of sample (HAU/50 μL). In addition, physiological saline was used as a negative control.

As a result, the virus adsorption amount was 64000 HA/ml-gel when the commercially available Cellufine Sulfate was used, and 217600 HA/ml-gel when the filler for chromatography of Production Example 5 was used. In addition, when the filler for chromatography of Production Example 6 was used, the value was 112,000 HA/ml-gel.

Compared to the commercially available Cellufine Sulfate as a dense particle, the fillers for chromatography of Production Examples 5 and 6 exhibited 10% DBC of influenza virus of 3.4 times and 1.75 times, respectively. Production Example 5 using porous particles in which the retention time of dextran with a molecular weight of 2 million was 29.6 minutes showed a high 10% DBC. On the other hand, Production Example 6 using porous particles in which the retention time of dextran with a molecular weight of 2 million was 15.0 minutes had a lower 10% DBC than Production Example 5.

[Relationship Between Pressure Loss and Linear Velocity]

The particles obtained in each of Production Example 5 and Production Example 6 were filled to 10 cm (±1 cm) in a chromatography column (made by JNC) having an inner diameter of 10 mm. Pure water of 20° C. was passed through this column, and the pressure loss, which is the pressure difference between the column inlet and column outlet, was measured. Note that the liquid flow started at 0.5 ml/min at the beginning, and then the flow rate was increased stepwise. After the liquid flowing was continued for 1 minute or more, the pressure loss was measured. As a blank, the pressure loss applied only to the column without packing particles was measured, and the pressure applied to the particles was calculated using the formula below.

$$\text{Pressure loss due to the particles (MPa)} = \text{Pressure at the column inlet (MPa)} - \text{Pressure at the column outlet (MPa)} - \text{Pressure loss due to the column only (MPa)}$$

In addition, the linear velocity was calculated using the following formula.

$$\text{Linear velocity (cm/h)} = \text{flow rate during the measurement (ml/h)/cross-sectional area of the column (cm}^2\text{)}$$

Figure 8:
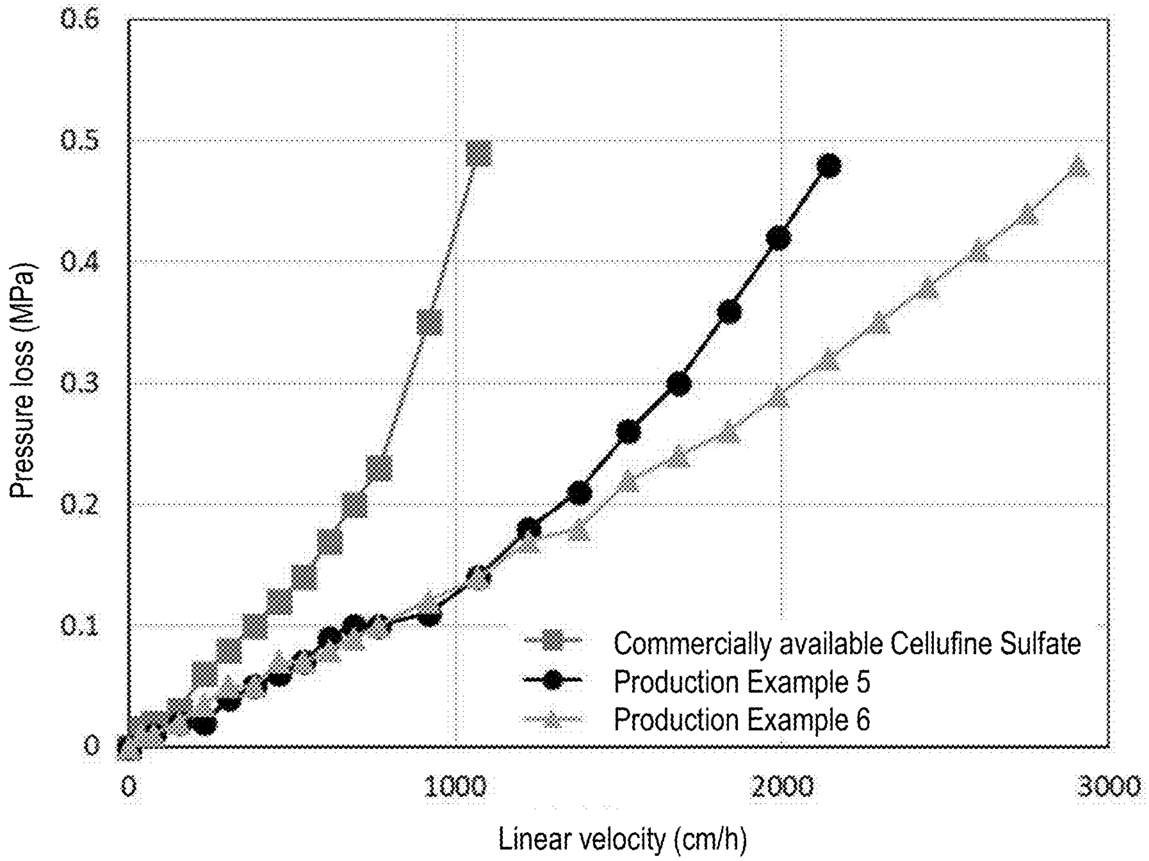
FIG. 8 is a graph showing the relationship between the pressure loss of the particles being produced in Production Example 5 or 6 and the linear velocity.

The results are shown in FIG. 8. It is clear from FIG. 8 that as compared to the commercially available Cellufine Sulfate, Production Examples 5 and 6 had low pressure loss and maintained high flow rate characteristics at the same linear velocity.

As these results show, when the porous particles of this invention are used as a filler for chromatography, the 10% DBC is 3.4 times that of the commercially available Cellufine Sulfate used as a control, and the pressure loss characteristics are also good.

INDUSTRIAL APPLICABILITY

In this invention, a porous particle having a controlled 3D network skeleton and communicating pores that include the voids of the skeleton and penetrate from the particle surface to the inside, a method for producing the same, and a filler for chromatography using the same are shown. The porous particles obtained by the production method of this invention can be applied to fillers for chromatography in which the voids of the communicating pores inside the particles can also be used as adsorption sites. Hence, high throughput and high processing speed can be achieved in the separation/purification process of pharmaceuticals, etc., making them very useful industrially.

What is claimed is:

1. A plurality of porous particles, each of the plurality of porous particles comprises 50% by mass or more of cellulose acetate or cellulose, and being characterized in: being spherical, having a 3D network skeleton and communicating pores that include voids of the skeleton and penetrate from a particle surface to inside, and that a retention time of dextran with a molecular weight of 2 million between and inside the particles at a flow rate of 0.4 ml/min in a column with an inner diameter of 0.78 cm and a length of 30 cm filled with the plurality of porous particles is 20 minutes or more.

2. The plurality of porous particles of claim 1, wherein a retention time of silica nanoparticles with a particle size of 30 nm at a flow rate of 0.4 ml/min in a column with an inner diameter of 0.78 cm and a length of 30 cm filled with the plurality of porous particles is 16 minutes or more.

3. The plurality of porous particles of claim 1, wherein the each of the plurality of porous particles has a mode diameter in a range of 1 to 1000 μm.

4. The plurality of porous particles of claim 1, wherein the each of the plurality of porous particles has a specific surface area measured with a BET multipoint method in a range of 1 to 200 $m^2/g$.

5. A filler for chromatography, comprising the plurality of porous particles of claim 1, or the plurality of porous particles of claim 1 which have been saponified, crosslinked or modified.

6. A method for separating and purifying virus particles using the filler for chromatography of claim 5.

7. A method for producing porous particles, comprising:

(a) a step of preparing a cellulose acetate solution, comprising heating and dissolving cellulose acetate in a mixed solvent of a solvent in which cellulose acetate is soluble and a solvent in which cellulose acetate is insoluble, wherein the solvent in which cellulose acetate is insoluble is a lower alcohol, a glycol, or an ether;

(b) a step of dispersing the cellulose acetate solution in water containing an emulsion stabilizer to obtain a dispersion system; and (c) a step of cooling the dispersion to precipitate cellulose acetate particles, wherein the mixed solvent is immiscible with water.

8. The method of claim 7, wherein in (a), the solvent in which cellulose acetate is soluble is benzyl alcohol, ethyl acetate, cyclohexanone, or isophorone.

9. The method of claim 7, wherein in (a), a volume ratio of the solvent in which cellulose acetate is soluble to the solvent in which cellulose acetate is insoluble in the mixed solvent ranges from 5:95 to 95:5.

10. The method of claim 7, wherein in (a), a content of cellulose acetate in the mixed solvent is 0.1 to 30 wt % based on the cellulose acetate solution.

11. The method of claim 7, wherein in (a), the mixed solvent contains a polymer as a third component, which is polyethylene glycol or polypropylene glycol.

12. The method of claim 7, wherein in (b), the emulsion stabilizer is sodium dodecylbenzenesulfonate, polyvinyl alcohol, carboxymethyl cellulose, hydroxyethyl cellulose, or a mixture thereof.

13. The method of claim 7, wherein in (c), a cooling rate of the dispersion system is 0.1° C./min to 10° C./min.

* * * * *